Patented May 22, 1951

2,554,213

UNITED STATES PATENT OFFICE 2,554,213

1-PYRAZOLO-(4:3-d)-PYRIMIDINE DERIVATIVES

Francis Leslie Rose, Blackley, Manchester, England, assignor to Imperial Chemical Industries Limited, a corporation of Great Britain No Drawing. Application May 5, 1950, Serial No. 160,390. In Great Britain May 13, 1949

5 Claims. (Cl. 260—256.4)

This invention relates to 1-pyrazolo-(4:3-d)-pyrimidine derivatives which possess therapeutic activity against experimentally produced tubercular infections in small mammals.

The new compounds which we have found to possess this important property may be represented by the general formula

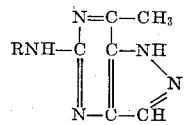

wherein R represents hydrogen or an alkali radical of 2-8 carbon atoms.

The said new compounds are derivatives of the fused ring system of the skeleton formula:

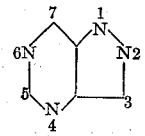

and they may thus be known as 1-pyrazolo-[4:3-d]-pyrimidines or alternatively as isopurines (see "the Ring Index": Patterson and Capell. 1940, No. 747). In the present specification they will hereafter be referred to as isopurines and the numbering employed will be that of "The Ring Index," namely that given in the skeleton formula above. Thus the compounds with which this invention is concerned are 5 - amino - or alkylamino-7-methylisopurines.

Of the compounds which we have found to possess excellent therapeutic activity, comparable with that of streptomycin, against experimentally produced tubercular infections in small mammals there may be mentioned for example 5 - amino - 7 - methyl - isopurine, 5 - ethylamino-7-methyl-isopurine, 5-isopropylamino-7-methyl-isopurine, 5-n - butylamino - 7 - methylisopurine and 5-n-amylamino-7-methylisopurine.

The said new compounds may be obtained by subjecting a 2:5-diaminopyrimidine derivative of of the formula

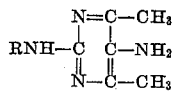

wherein R has the significance stated above, to a diazotisation process such that the 5-amino-group is converted into the diazonium salt, the said diazonium salt being then caused to undergo internal coupling with one of the 4- and 6-methyl groups.

The said diazotisation process is conveniently brought about for example by the addition of a solution of sodium nitrite to a cooled solution of the 5 - aminopyrimidine derivative in dilute aqueous hydrochloric acid. Even when R is hydrogen, that is when the starting material is for example a 2:5-diaminopyrimidine derivative only the 5-amino group is diazotised by this process the 2-amino group remaining substantially unchanged.

The internal coupling of the diazonium salt may conveniently be brought about by the action of aqueous alkali thereupon. Preferably the alkali to be used is a caustic alkali since if mild alkalis such as ammonia or sodium carbonate be used there is a tendency towards the formation of an excessive proportion of coloured by-products which are probably intermolecular azo compounds. To best advantage, even when using the preferred caustic alkali, we have found that the solution of the diazonium salt is added slowly to an agitated aqueous solution of the caustic alkali.

Of the 2:5 - diaminopyrimidine derivatives which are used as starting materials in the manufacture of the new compounds of this invention, 2:5-diamino-4:6-dimethyl-pyrimidine is a known compound, made by reduction of 2-amino-5-benzeneazo - 4:6 - dimethylpyrimidine which is itself obtained by interaction of guanidine with the reaction product of diazotised aniline and acetylacetone (Journal of the Chemical Society, 1947, page 51). The other 2:5 - diamino-pyrimidine derivatives used as starting materials in the manufacture of the new compounds of this invention are themselves new compounds. They may be obtained by a process analogous to that described above by use in the reactions of an appropriately substituted guanidine and of an appropriate acylacetone.

The invention is illustrated but not limited by the following examples in which the parts are by weight:

Example 1

70 parts of sodium nitrite are dissolved in 200 parts of water and the solution is added during 15 minutes to a stirred solution of 138 parts of 2:5-diamino-4:6-dimethylpyrimidine in a mixture of 1000 parts of water and 200 parts of concentrated hydrochloric acid kept at a temperature below 15° C. The mixture is then added during 45 minutes below the surface of a vigorously stirred mixture of 400 parts of 40% aqueous sodium hydroxide solution and 500 parts of crushed ice. To the resulting solution there is added concentrated hydrochloric acid until it is just acid to litmus. It is then filtered and the solid residue consists of 5-amino-7-methylisopurine which may be purified by dissolving it in concentrated aqueous hydrochloric acid and then adding to the solution an excess of a concentrated aqueous solution of sodium bisulphite. The precipitated product is filtered off and dissolved in dilute aqueous sodium hydroxide and to the solution there is added an excess of ammonium chloride. The precipitate is filtered off and consists of pure 5-amino-7-methylisopurine as pale cream crystals which melt at 303–304° C. with decomposition.

*Example 2*

An equivalent amount of 2-ethylamino-5-amino-4:6-dimethylpyrimidine (M. P. 72° C.) is used in place of 2:5-diamino-4:6-dimethylpyrimidine in the process of Example 1. There is obtained 5-ethylamine-7-methylisopurine as colourless needles, M. P. 224° C.

*Example 3*

An equivalent amount of 2-isopropylamino-5-amino-4:6-dimethylpyrimidine (M. P. 101° C.) is used in place of 2:5-diamino-4:6-dimethylpyrimidine in the process of Example 1. There is obtained 5-isopropylamino-7-methylisopurine as colourless leaflets, M. P. 213°–215° C.

*Example 4*

An equivalent amount of 2-n-butylamino-5-amino-4:6-dimethylpyrimidine (M. P. of its sulphate 150° C.) is used in place of the 2:5-diamino-4:6-dimethylpyrimidine in the process of Example 1. There is obtained 5-n-butylamino-7-methylisopurine as colourless needles, M. P. 162° C.

*Example 5*

An equivalent amount of 2-n-amylamino-5-amino-4:6-dimethylpyrimidine (M. P. of its sulphate 144° C.) is used in place of the 2:5-diamino-4:6-dimethylpyrimidine in the process of Example 1. There is obtained 5-n-amylamino-7-methylisopurine as colourless prisms, M. P. 154° C.

What I claim is:

1. New compounds of the formula:

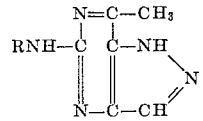

wherein R is a radical from the group consisting of hydrogen and an alkyl radical of 2–8 carbon atoms.

2. Process for the manufacture of the new compounds claimed in claim 1 which comprises subjecting a 5-aminopyrimidine of the formula

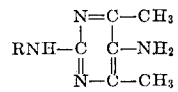

wherein R is a radical from the group consisting of hydrogen and an alkyl radical of 2–8 carbon atoms to a diazotisation process such that the 5-amino group is converted into the diazonium salt, the said diazonium salt being then caused to undergo internal coupling with one of the 4- and 6-methyl groups.

3. Process as claimed in claim 2 wherein the diazotisation step is brought about by addition of a solution of sodium nitrite to a cooled solution of the 5-aminopyrimidine in dilute aqueous hydrochloric acid.

4. Process as claimed in claim 2 wherein the internal coupling is brought about by action of caustic alkali on the diazonium solution.

5. Process as claimed in claim 4 wherein the diazonium solution is added to an agitated aqueous solution of the caustic alkali.

FRANCIS LESLIE ROSE.

No references cited.